3,132,128
AMIDO-PHOSPHAZIDES
Hugo Malz, Leverkusen, Germany, assignor to Farbenfabriken Bayer Aktiengesellschaft, Leverkusen, Germany, a corporation of Germany
No Drawing. Filed Sept. 26, 1960, Ser. No. 87,519
Claims priority, application Germany Sept. 24, 1959
12 Claims. (Cl. 260—140)

The present invention relates to and has as its objects new and useful pesticides and processes for their production. Generally the new compounds of this invention may be described as phosphazides of the following formula

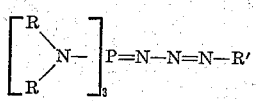

in which R and R' are organic radicals.

It is known that organic azido-compounds react with tertiary phosphines and also with phosphorous acid esters, (see Staudinger and J. Meyer, Helvetica. Chimica Acta, vol. 2, 1919, page 635; H. Staudinger and E. Hauser, Helvetica Chimica Acta, vol. 4, 1921, page 861, and M. J. Kabacnik and V. A. Geljarov, Izvestija Akademii Nauk S.S.R. (Bulletin de l'Academie des Sciences de l'U.S.S.R.), vol. 1956, page 790).

The compounds formed by this reaction are called phosphazides by Staudinger and they are usually very easily decomposed as they change to phosphinic imines under nitrogen development as shown in the following formula scheme:

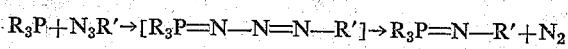

Only in very few cases and with the use of tertiary phosphines some phosphazides were obtained successfully as yet. Therefore, only few phosphazides have been known as yet and they were only stable at room temperature and only for a short while. Usually only their decomposition products, the imines which contain less nitrogen could be isolated.

The more surprising is the present invention which consists in the discovery that amido-phosphazides are formed by reaction of organic azides with phosphoric acid triamides. Surprisingly the new compounds of this invention are completely stable at room temperature. Most probably the following general formula represents the new compounds:

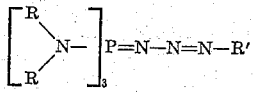

In this formula as said above R and R' stand for any organic radical, more specifically R stands for alkyl radicals, especially lower alkyl radicals, up to 4 carbon atoms. The group

also may form a ring system of the piperidine, piperazine, morpholine, thiamorpholine, pyrrolidine series and the like. R' stands for the radical of an organic azide, especially of the aromatic series or of an aromatic carboxylic acid. As examples there may be mentioned for the group R' phenyl, o-, m-, p-chlorophenyl, o-, m-, p-xylyl, lower dialkyl amino phenyl, nitrophenyl, naphthyl and naphthyl radicals substituted as said above, benzoyl, halobenzoyl, nitrobenzoyl, lower alkyl benzoyl, α- or β-naphthoyl.

The inventive amidophosphazides are usually slightly colored crystalline or oily compounds which are not decomposed at room temperature even for many weeks. The crystalline compounds may be heated up to their melting point without decomposition. But at higher temperatures above the melting point there occurs decomposition under nitrogen development and the corresponding imines are formed.

The strongly exothermic reaction between organic azides and phosphoric acid triamides can be controlled by using inert diluents. Thereby it is not necessary to dissolve the phosphoric acid triamides in these diluents, as phosphoric acid triamides also react in the form of suspensions with the azides in the solutions.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers there may be mentioned talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the present invention the compounds of the following formulae

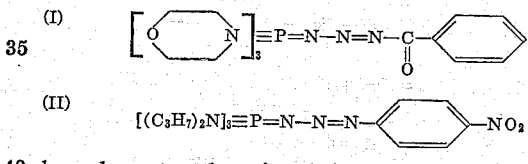

have been tested against spider mites and caterpillars. Aqueous dilutions of these compounds have been prepared by mixing the active ingredient with the same amount of dimethyl formamide as an auxiliary solvent adding thereafter 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs. The tests have been carried out as follows:

(a) Against spider mites (contact-insecticidal action): Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
| --- | --- | --- |
| (I) | 0.01 | 100 |
| (II) | 0.01 | 100 |

(b) Against caterpillars: White cabbage has been sprayed drip wet with aqueous emulsions as prepared above in the concentration as indicated below. Caterpillars (of the type diamond back moth, 10 each) have been placed on the sprayed leaves of the white cabbage. The living status has been determined after 24 hours and 48 hours. The result is to be seen from the following table:

| Compound | Aqueous concentration (in percent active ingredient/water) | Killing rate (in percent) |
|---|---|---|
| (I) | 0.01 | 100 |
| (II) | | |

The following examples are given for the purpose of illustrating the present invention, without, however, limiting it in any way thereto:

*Example 1*

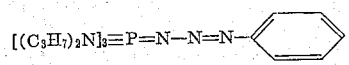

A solution of 11.9 grams of phenyl-azide in 50 ml. of ether is added dropwise while stirring to a solution of 33.1 grams of tris-(n-dipropyl)-phosphoric acid amide. The temperature of the reaction-mixture is kept below 30° C. by external cooling with ice-water. Stirring is continued for 10 minutes and the diluent is distilled off from the mixture. A slightly brown oil is obtained which solidifies after a short while. By recrystallizing the raw crystalline material from benzine there are obtained lemon-yellow crystals of a melting point of about 55° C. The yield is approximately 43 grams.

$C_{15}H_{26}N_6P$—Calculated: P, 6.97%; N, 18.9%. Found: P, 7.0%; N, 18.5%.

Aphids and spider mites are killed completely with 0.1% solutions.

By the same way there may be obtained the compounds of the following formulae:

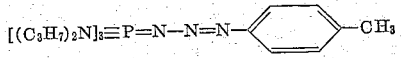

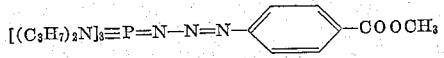

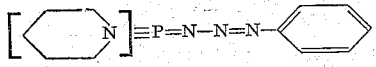

*Example 2*

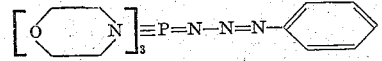

A solution of 11.9 grams of phenyl-azide in 50 ml. of ether is added dropwise while stirring to a suspension of 28.9 grams of phosphoric acid trimorpholide in 150 ml. of ether. The temperature of the mixture is kept below +30° C. by external cooling with ice-water. The colorless crystals of the phosphoric acid triamide change to a fine golden-yellow precipitation during the reaction. After stirring the mixture for a short while the precipitation is filtered with suction. Lemon-yellow crystals are obtained which melt at 129° C. under decomposition. After recrystallizing the crystals from a mixture of benzene and benzine the melting point is 145° C. Yield about 39 grams.

By the same way there may be obtained the compound of the following formula:

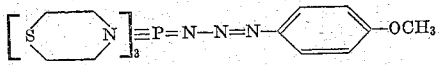

*Example 3*

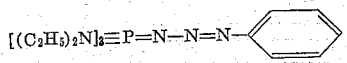

In the same manner as described in Example 1 there is obtained a yellow-greenish viscous oil from phenyl-azide and tris-(n-diethyl)-phosphoric acid triamide. The yield is about 95% of the theoretical.

$C_{12}H_{20}N_6P$—Calculated: N, 22.95%; P, 8.47%. Found: N, 23.11%; P, 8.7%.

By the same way there may be obtained the compound of the following formula:

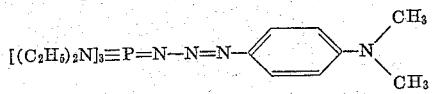

*Example 4*

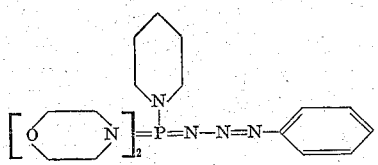

To a suspension of 9 grams of dimorpholido-phosphoric acid-piperidide in 100 ml. of ether there is added dropwise a solution of 4 grams of phenyl-azide in 25 ml. of ether. At a moderate exothermic reaction the colorless phosphoric acid triamide changes to a fine yellow precipitation, which is sucked off after stirring for about 10 minutes. After the precipitation has been washed with ether it is pressed on clay. Golden-yellow crystals are obtained which melt at 129° C. under nitrogen development (decomposition). Yield about 12 grams.

*Example 5*

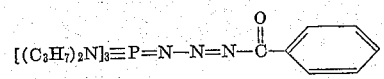

By reacting equimolecular quantities of benzoyl-azide with tris-(n-dipropyl)-phosphoric acid triamide in ether there is formed a solution of a red-brown color when slightly heating the mixture. After the ether has been distilled off from the solution there remains a clear, orange-red, viscous oil which solidifies after a short time. The crystalline mixture is pressed on clay and crystals are obtained, which show the following analytical data:

$C_{16}H_{26}ON_6P$—Calculated: N, 17.6%; P, 6.4%. Found: N, 17.33%; P, 6.6%.

Yield about 95% of the theoretical.

Spider mites are killed completely with 0.1% solutions, aphids are killed completely with 0.1% solutions.

By the same way there may be obtained the compounds of the following formulae:

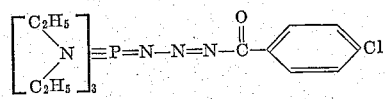

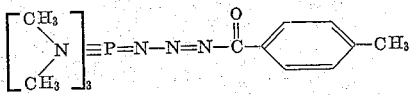

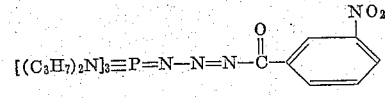

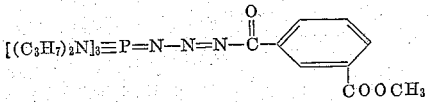

*Example 6*

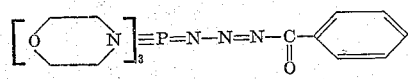

To a mixture of 14.7 grams of benzoylazide in 150 ml. of ether there is added while cooling externally with water a solution of 28.9 grams of phosphoric acid trimorpholide in 150 ml. of benzene. After stirring, golden-yellow crystals separate from the orange-red solution which are sucked off, washed with ether and dried on clay. Melting point 86–87° C. under decomposition. Yield about 40 grams.

Spider mites are killed completely with 0.01% solutions.

Example 7

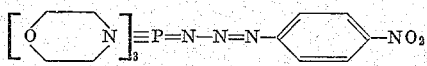

As described in Example 2 there is obtained a phosphazide consisting of yellow crystals, by reacting equimolecular quantities of p-nitrophenyl-azide with phosphoric acid trimorpholide in ether or benzene which melts after washing it with ether and drying it on clay at 145–147° C. under decomposition. Yield about 95% of the theoretical.

By the same way there may be obtained the compound of the following formula:

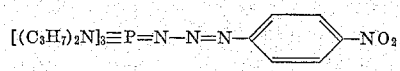

Spider mites and caterpillars are killed completely with 0.01% solutions.

Example 8

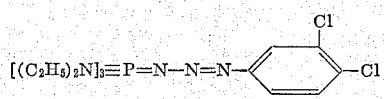

18.8 grams of 3.4-dichloro-phenyl-azide dissolved in 100 ml. of ether are added dropwise to a solution of 24.7 grams of tris-n-(diethyl)-phosphoric acid triamide in 100 ml. of ether. The temperature of the ether solution rises to about 30° C. and becomes of an orange-red color. After about 15 minutes the solution is filtered and the solvent is distilled off. A brown viscous oil is obtained which does not crystallize even after standing for a long time. Yield about 41 grams.

Spider mites are killed completely with 0.01% solutions. Caterpillars are killed to 90% with 0.1% solutions.

By the same way there may be obtained the compound of the following formula:

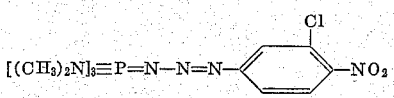

Spider mites are killed completely with 0.01% solutions. Aphids and caterpillars are killed completely with 0.1% solutions.

Example 9

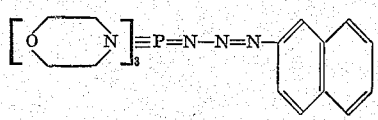

To a solution of 28.9 grams of phosphoric acid trimorpholide in 100 ml. of benzene there is added dropwise a solution of 16.9 grams of β-naphthyl-azide in 100 ml. of benzene. The benzene solution takes an orange-red color while the temperature of the mixture rises to about 35° C. Stirring is continued for 15 minutes and the benzene is distilled off from the solution in vacuo. As a residue there is obtained a dark-brown viscous oil which crystallizes when it is rubbed with ether. When pressing the crystalline mixture on clay, the remaining light-brown crystals melt at 136–138° C. under decomposition. Yield about 40 grams.

Spider mites are killed completely with 0.01% solutions.

I claim:
1. An amido-phosphazide of the following formula

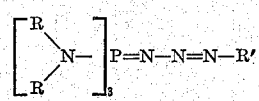

in which each R individually stands for a lower alkyl radical having up to 4 carbon atoms and when both R's are taken together with the geminal nitrogen,

stands for a member selected from the group consisting of piperidine, piperazine, morpholine, thiamorpholine, and pyrrolidine, and wherein R' stands for a member selected from the group consisting of phenyl, lower alkyl-substituted phenyl, chloro-substituted phenyl, nitro-substituted phenyl, lower dialkyl amino-substituted phenyl and lower alkoxy-substituted phenyl, naphthyl, benzoyl, chloro-substituted benzoyl, lower alkyl-substituted benzoyl, and nitro-substituted benzoyl.

2. A compound of claim 1 wherein each R stands for an alkyl radical having up to 4 carbon atoms and R' stands for phenyl.

3. A compound of claim 1 wherein each R stands for an alkyl radical having up to 4 carbon atoms and R' stands for benzoyl.

4. A compound of claim 1 wherein each R stands for an alkyl radical having up to 4 carbon atoms and R' stands for nitro phenyl.

5. A compound of claim 1 wherein each R stands for an alkyl radical having up to 4 carbon atoms and R' stands for chloro phenyl.

6. The compound of the following formula

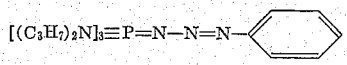

7. The compound of the following formula

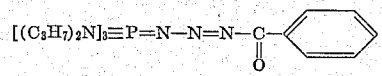

8. The compound of the following formula

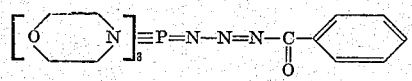

9. The compound of the following formula

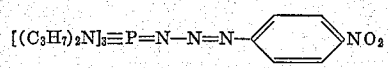

10. The compound of the following formula

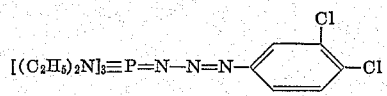

11. The compound of the following formula

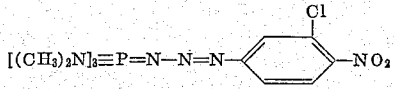

12. The compound of the following formula

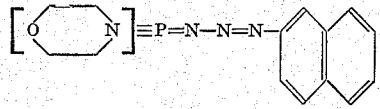

References Cited in the file of this patent

Kosolapoff: "Organosphosphorus Compounds" (1950), page 318.